United States Patent [19]

Kakizaki et al.

[11] Patent Number: 5,088,760
[45] Date of Patent: Feb. 18, 1992

[54] SEMI-ACTIVE SUSPENSION CONTROL SYSTEM WITH REDUCED SWITCHING FREQUENCY IN HARD AND SOFT SUSPENSION CHARACTERISTICS

[75] Inventors: Shinobu Kakizaki; Fumiyuki Yamaoka; Mitsuo Sasaki; Hiroyuki Shimizu; Junichi Emura, all of Kanagawa, Japan

[73] Assignee: Atsugi Unisia Corporation, Kanagawa, Japan

[21] Appl. No.: 548,222

[22] Filed: Jul. 5, 1990

[30] Foreign Application Priority Data

Jul. 10, 1989 [JP] Japan .................. 1-177792

[51] Int. Cl.⁵ .......................................... B60G 17/015
[52] U.S. Cl. ........................... 280/707; 280/709; 280/714
[58] Field of Search ............ 280/707, 709, 714, 702, 280/672; 188/280, 282

[56] References Cited

U.S. PATENT DOCUMENTS

| | | | |
|---|---|---|---|
| 4,615,420 | 10/1986 | Mourray | 280/714 |
| 4,726,453 | 2/1988 | Obstfelder et al. | 280/714 |
| 4,867,476 | 9/1989 | Yamanaka et al. | 280/714 |
| 4,909,534 | 3/1990 | Fukushima et al. | 280/714 |
| 4,961,483 | 10/1990 | Yamaoka et al. | 280/707 |

FOREIGN PATENT DOCUMENTS

| | | | |
|---|---|---|---|
| 58155/86 | 2/1989 | Australia. | |
| 249209 | 12/1987 | European Pat. Off. | 280/707 |
| 38013 | 2/1988 | Japan | 280/707 |
| 60411 | 3/1989 | Japan | 280/707 |
| 88/06983 | 9/1988 | World Int. Prop. O. | 280/707 |

OTHER PUBLICATIONS

Lizell, M., "Semi-Active Damping", IMechE, 1988, pp. 83-91.

Primary Examiner—Kenneth R. Rice
Assistant Examiner—Tamara L. Finlay
Attorney, Agent, or Firm—Ronald P. Kananen

[57] ABSTRACT

A suspension control system is designed to adjust suspension characteristics between hard and soft for bounding and rebounding stroke independently of each other. The system has a sensor means for monitoring speed of a vehicular body as a sprung mass for producing a vehicle body speed indicative signal, which vehicle body speed indicative signal has a variable signal polarity depending upon the direction of vibration, and a sensor means for monitoring relative speed between the vehicular body and a vehicular wheel as an unsprung mass for producing a relative speed indicative signal which also has a variable signal polarity depending upon the direction of relative movement of the vehicular body and the vehicular wheel. A control unit detects a combination of signal polarities of the vehicle body speed indicative signal and the relative speed indicative signal for adjusting damping characteristics for bounding and rebounding vibration independently of each other and depending on the detected combination.

12 Claims, 7 Drawing Sheets

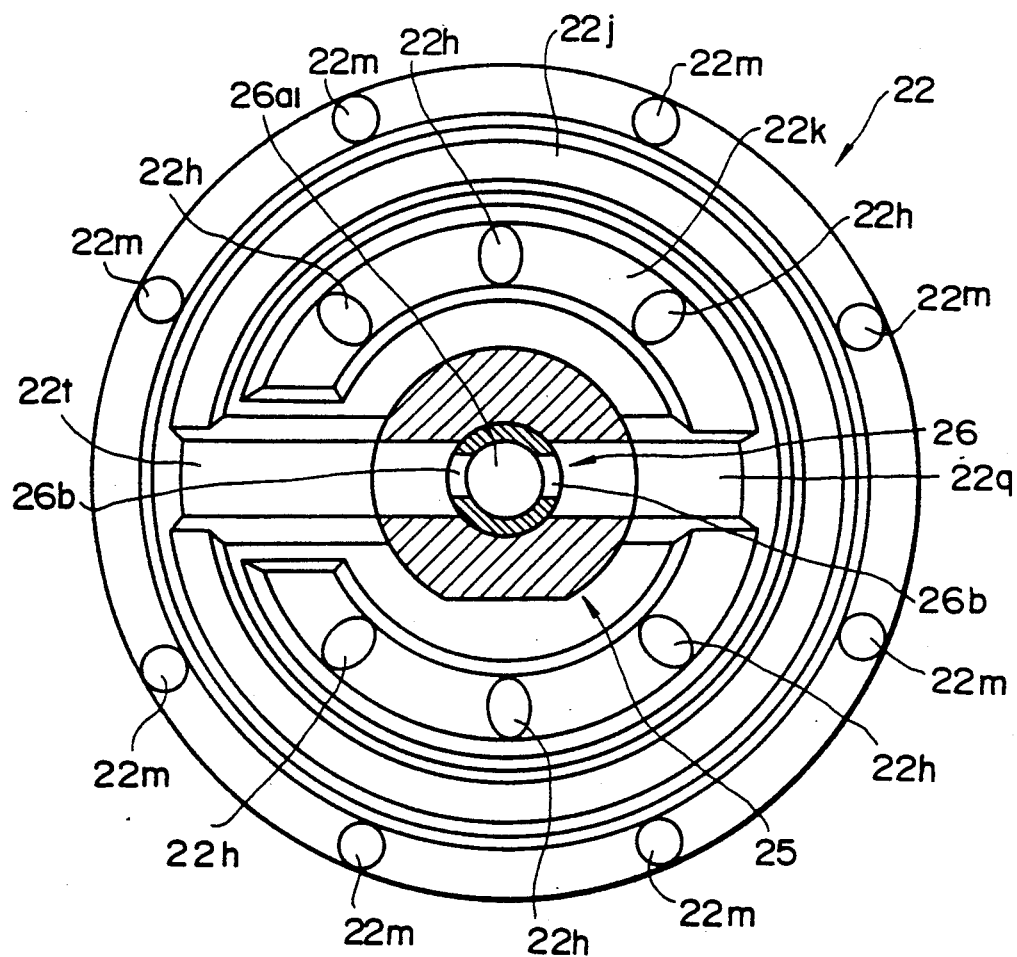
FIG. 3
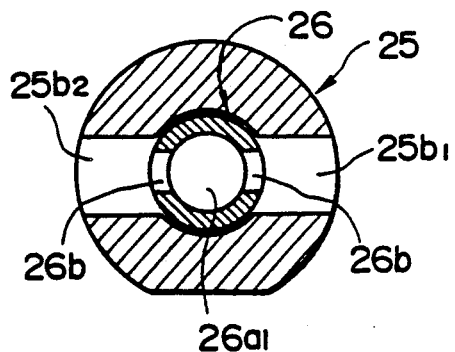
FIG. 4
FIG. 5

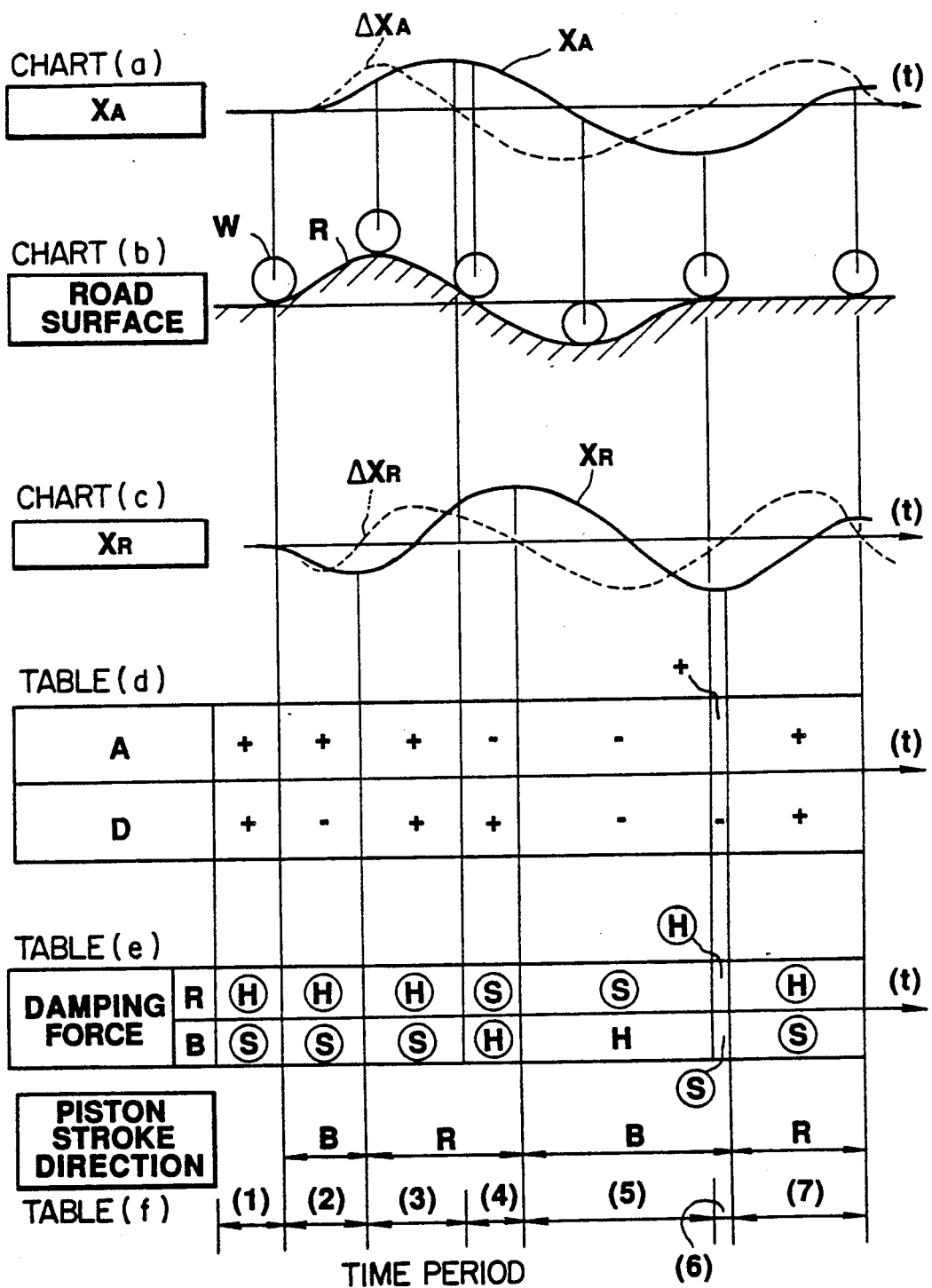

SEMI-ACTIVE SUSPENSION CONTROL SYSTEM WITH REDUCED SWITCHING FREQUENCY IN HARD AND SOFT SUSPENSION CHARACTERISTICS

BACKGROUND OF THE INVENTION

1. Field of the invention

The present invention relates generally to a suspension control system for an automotive vehicle for effectively adjusting suspension characteristics so as to obtain better shock absorbing ability. More specifically, the invention relates to a semi-action control system for an automotive vehicle which reduces frequency of switching of suspension characteristics for longer life of components associated for adjustment of suspension characteristics.

2. Description of the Background Art

Japanese Utility Model First (unexamined) Publication (Jikkai) Showa 63-112914 discloses a suspension control system for an automotive vehicle. In the disclosed suspension control system, relative displacement between a vehicular body as a sprung mass and a suspension member rotatably supporting a vehicular wheel and thus serving as an unsprung mass is monitored. When the direction of variation of relative distance is to increase a distance from a neutral position, then, the suspension characteristics are assumed for a softer suspension and to decrease a distance from the neutral position, the suspension characteristics are assumed for a harder suspension. The suspension control system detects input vibration frequency so as to assume softer suspension characteristics when the vibration frequency requires switching of suspension characteristics at a higher frequency than an actual switching frequency of suspension characteristics due to mechanical lag.

In such suspension control system, harder suspension characteristics are assumed both for bounding and rebounding stroke of vibration when harder suspension characteristics are selected, and softer suspension characteristics are assumed both for bounding and rebounding strokes when softer suspension characteristics are selected. Such manner of suspension control encounters drawbacks in certain vehicular traveling conditions. Namely, when vibration a composite vibration of high frequency components due to small undulation of the road surface and low frequency components due to vehicular body attitude change, difficulty may be encountered to select the suspension characteristics. Namely, if harder suspension characteristics are selected in response to the composite vibration, the suspension characteristics will become too stiff to effectively absorb road shock. On the other hand, if softer suspension characteristics are selected, suspension characteristics will become toosoft for suppressing vehicular body attitude change to cause degradation of vehicular driving stability.

Furthermore, at bouncing in which damping force generated by the suspension system alternatively serves for amplifying and absorbing vibration energy, the suspension. characteristics should be switched between soft and hard characteristics repeatedly. This causes high frequency of necessity of switching of the damping characteristics. This clearly shortens the life of the mechanism for switching the damping characteristics.

SUMMARY OF THE INVENTION

Therefore, it is an object of the present invention to provide a suspension control system which can achieve both vehicular driving stability and riding comfort with expansion of life of means for adjusting the damping characteristics.

Another object of the invention is to provide a suspension control system which can reduce frequency of switching of damping characteristics without causing degradation of vehicular driving stability and riding comfort.

In order to accomplish the aforementioned and other objects, a suspension control system, according to the present invention, designed to adjust suspension characteristics between hard and soft for bounding and rebounding strokes independently of each other. The system has a sensor means for monitoring speed of a vehicular body as a sprung mass for producing a vehicle body speed indicative signal, which vehicle body speed indicative signal has a variable signal polarity depending upon the direction of vibration, and a sensor means for monitoring relative speed between the vehicular body and a vehicular wheel as an unsprung mass for producing a relative speed indicative signal which also has a variable signal polarity depending upon direction of relative movement of the vehicular body and the vehicular wheel. A control unit detects a combination of signal polarities of the vehicle body speed indicative signal and the relative speed indicative signal for adjusting the damping characteristics for bounding and rebounding vibration independently of each other and depending on the detected combination.

According to one aspect of the invention, a suspension control system for an automotive vehicle comprises:

A suspension system disposed between a vehicular body and a vehicular wheel and having a damping force generating means for generating a damping force against relative displacement between the vehicular body and the vehicular wheel from a neutral position, said damping force generating means having variable damping characteristics at least between a hard mode to produce a greater damping force and a soft mode to produce a smaller damping force;

An actuator associated with said damping force generating means, for controlling operational mode at least between said hard and soft modes depending upon a control supplied thereto;

first means for monitoring relative speed between said vehicular body and said vehicular wheel to produce a relative speed representative signal having a variable polarity depending upon direction of the relative speed;

Second means for monitoring vertical acceleration exerted on said vehicular body to produce a vertical acceleration representative signal which has a variable polarity depending upon the direction of the vertical acceleration exerted;

Third means receiving said relative speed representative signal and said vertical acceleration representative signal for deriving said control signal on the basis of a phase relationship of said relative speed representative signal and said vertical acceleration representative signal, and of the phase of said relative speed representative signal.

Preferably, the damping force generating means has variable damping characteristics for a bounding stroke and for a rebounding stroke in an alternating fashion. In the alternative, the damping force generating means has variable damping characteristics for a bounding stroke and for a rebounding stroke independently of each other.

The third means may generate said control signal for assuming a hard mode for a rebounding stoke and a soft mode for a bounding stroke when the polarities of said relative speed representative signal and said vertical acceleration representative signal being are coincident to each other and the polarity of said relative speed representative signal represents the relative speed in a rebounding direction, and for assuming a hard mode for a bounding stroke and a soft mode for a rebounding stroke when polarities of said relative speed representative signal and said vertical acceleration representative signal are coincident and the polarity of said relative speed representative signal represents the relative speed in a bounding direction. Furthermore, the third means may generate a control signal for assuming a hard mode for a bounding when the polarities of said relative speed representative signal and said vertical acceleration representative signal are different from each other and the polarity of said relative speed representative signal represents a rebounding stroke, and for assuming a hard mode for a rebounding stroke and a soft mode for a bounding stroke when the polarities of said relative speed representative signal andd said vertical acceleration representative signal are different from each other and the polarity of said relative speed representative signal represents the bounding stroke.

The damping force generating means may comprise a variable damping force shock absorber defining first and second fluid chambers communicating each other across a primary fluid path means and an auxiliary fluid path means may be defined through a piston disposed between said frist and second fluid chambers and a variable orifice means providing a varying flow restriction magnitude in said auxiliary fluid path means. The auxiliary fluid path means may comprise a first auxiliary fluid path active for permitting fluid flow therethrough during a piston rebounding stroke and a second auxiliary fluid path active for permitting fluid flow therethrough during a piston bounding stroke, and said variable orifice means comprises a first orifice provided in said first auxiliary fluid path and a second orifice provided in said second auxiliary fluid path, said first and second orifices having a variable flow restriction magnitude at least between said hard mode and said soft mode. On the other hand, the variable orifice means comprises a single rotary valve defining said first and second orifices and associated with said actuator means to be rotatingly driven for varying the operational mode between a first position corresponding to a hard mode and a second position corresponding to a soft mode. In such case, the first and second orifices are formed with axial and angular offset with respect to each other, wherein the magnitudes of angular offset of said first and second orifices are so determined as to place said second orifice at said second position when said first orifice is set at said first position, and at said first position when said first orifice is set at said second position.

According to another aspect of the invention, a variable damping force shock absorber comprises hollow cylinder comprises:

A piston disposed within said hollow cylinder and defining first and second fluid chambers communicating with each other across primary fluid path means and an auxiliary fluid path means defined therethrough, said first and second fluid chambers and a variable orifice means providing a varying flow restriction magnitude in said auxiliary fluid path means, said auxiliary fluid path means including a first auxiliary fluid path active for permitting fluid flow therethrough during a piston rebounding stroke and a second auxiliary fluid path active for permitting fluid flow therethrough during a piston bounding stroke, and said variable orifice means including a first orifice provided in said first auxiliary fluid path and a second orifice provided in said second auxiliary fluid path, said first and second orifices having a variable flow restriction magnitude at least between said hard mode and said soft mode, and said variable orifice means comprises a single rotary valve defining said first and second orifices and associated with said actuator means to be rotatingly drive for varying the operational mode between a first position corresponding to a hard mode and a second position corresponding to a soft mode.

In this case, the first and second orifices may be formed with axial and angular offsets with respect to each other, wherein the magnitude of angular offset of said first and second orifices is so determined as to place said second orifice at said second position when said first orifice is set at said first position, and at said first position when said first orifice is set at said second position. Furthermore, the first and second orifices block fluid communication at said first position and permit fluid communication at said second position.

BRIEF DESCRIPTION OF THE DRAWINGS

The present invention will be understood more fully from the detailed description given herebelow and from the accompanying drawings of the preferred embodiment of the invention, which however, should not be taken to limit the invention to the specific embodiment but are for explanation and understanding only.

In the drawings:

FIG. 3 is a further enlarged plan view of a piston in the variable damping force shock absorber of FIG. 2;

FIG. 4 is a section showing a rotary valve employed in a the piston assembly for adjusting damping characteristics, which rotary valve is placed in soft mode position;

FIG. 5 is a similar section to FIG. 4, but showing to rotary valve in a harder mode position;

FIG. 9 is a chart showing similar to FIG. 8 but showing the suspension control operation taking place in response to bounding.

DESCRIPTION OF THE PREFERRED EMBODIMENT

Figure 1:
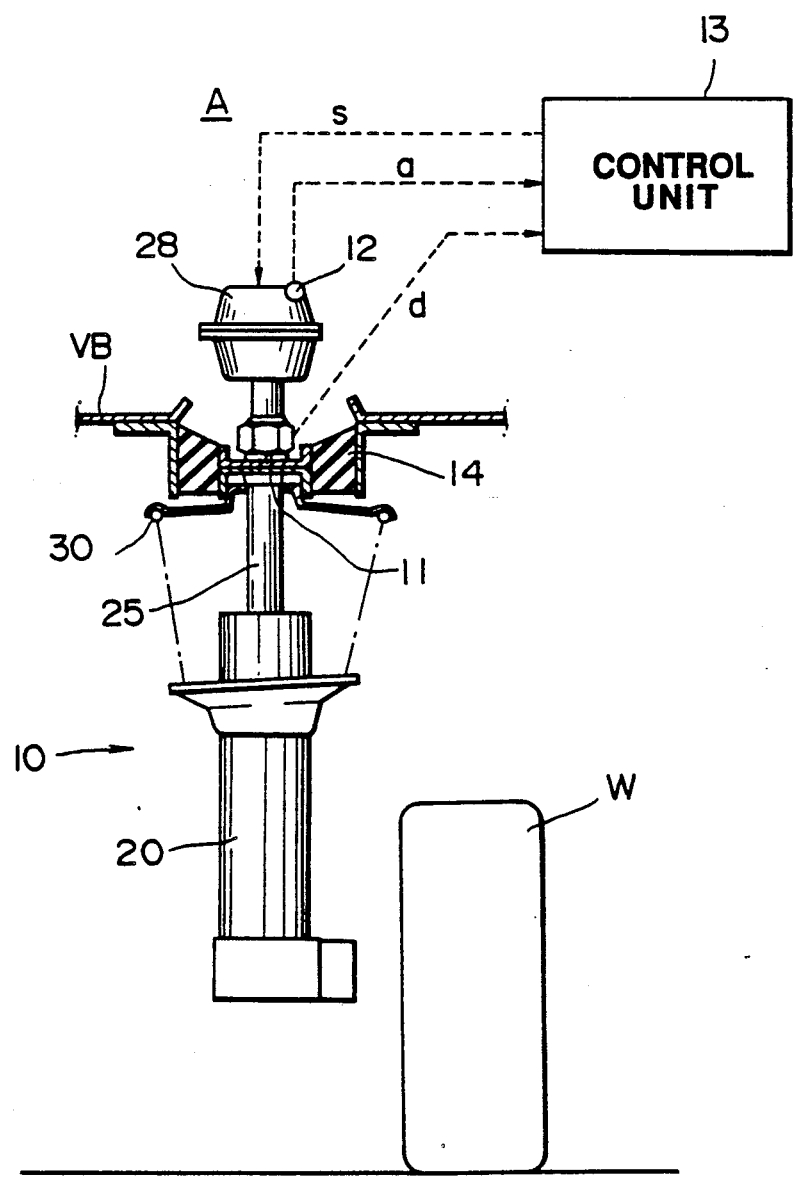
FIG. 1 is a schematic or fragmentary illustration of an automotive suspension system with the preferred embodiment of a suspension control system, according to the present invention.

Referring now to the drawings, particularly to FIG. 1, the preferred embodiment of a suspension control system, according to the present invention, includes a suspension system A disposed between a vehicular body as represented by the label VB and a vehicular wheel W rotatably supported on a suspension member (not shown) in a per se known manner. The suspension system A comprises a strut assembly 10 including a variable damping force shock absorber. A load sensor 11 and an acceleration sensor 12 are provided at the top end of the strut assembly 10. The load sensor 11 is installed with a rubber bushing 14 which is attached on the vehicular body VB and designed and arranged to monitor vertical load exerted on the top end of the suspension strut assembly 10 for producing a load indicative signal d. Since the load indicative signal d represents the magnitude of distortion of the load sensor 11 caused by relative displacement between the vehicular speed and the vehicular wheel. The magnitude of the load indicative signal d is proportional to the relative speed of the relative displacement between the vehicular body VB and the vehicular wheel W. Therefore, in the shown embodiment, the load indicative signal d serves as data representative of the relative speed between the vehicular body and the vehicular wheel. On the other hand, the acceleration sensor 12 is designed to monitor vertical acceleration in vertical displacement of the vehicular body for producing a vertical acceleration indicative signal a. The suspension control system has a control unit 13 which comprises a microprocessor and is so fabricated to process the vertical load indicative signal d and the vertical acceleration indicative signals a for producing a control signal for adjusting suspension characteristics.

It should be appreciated that the vertical load sensor 11 and the vertical acceleration sensor 12 are provided for respective suspension systems for respective wheels.

The strut assembly 10 comprises a variable damping force shock absorber 20 and a suspension coil spring 30. The shock absorber 20 has a piston rod 25 connected to an actuator 28 which is electrically operable for adjusting the damping characteristics of the shock absorber 20. In practice, the damping characteristics of the shock absorber 20 are adjustable by rotatingly driving the piston rod 25 by means of an actuator 28.

Detailed construction of the variable damping force shock absorber 20 will be discussed herebelow with reference to FIG. 2. However, it should be appreciated that the specific construction of the shock absorber which is employed in the shown embodiment of the present invention, is just preferred but not essential to implement the present invention. Therefore, it should be appreciated that the shown shock absorber is merely an example and that the suspension control system according to the present invention is able to be applied for any type of variable damping force shock absorbers which are adapted for remote control.

Figure 2:
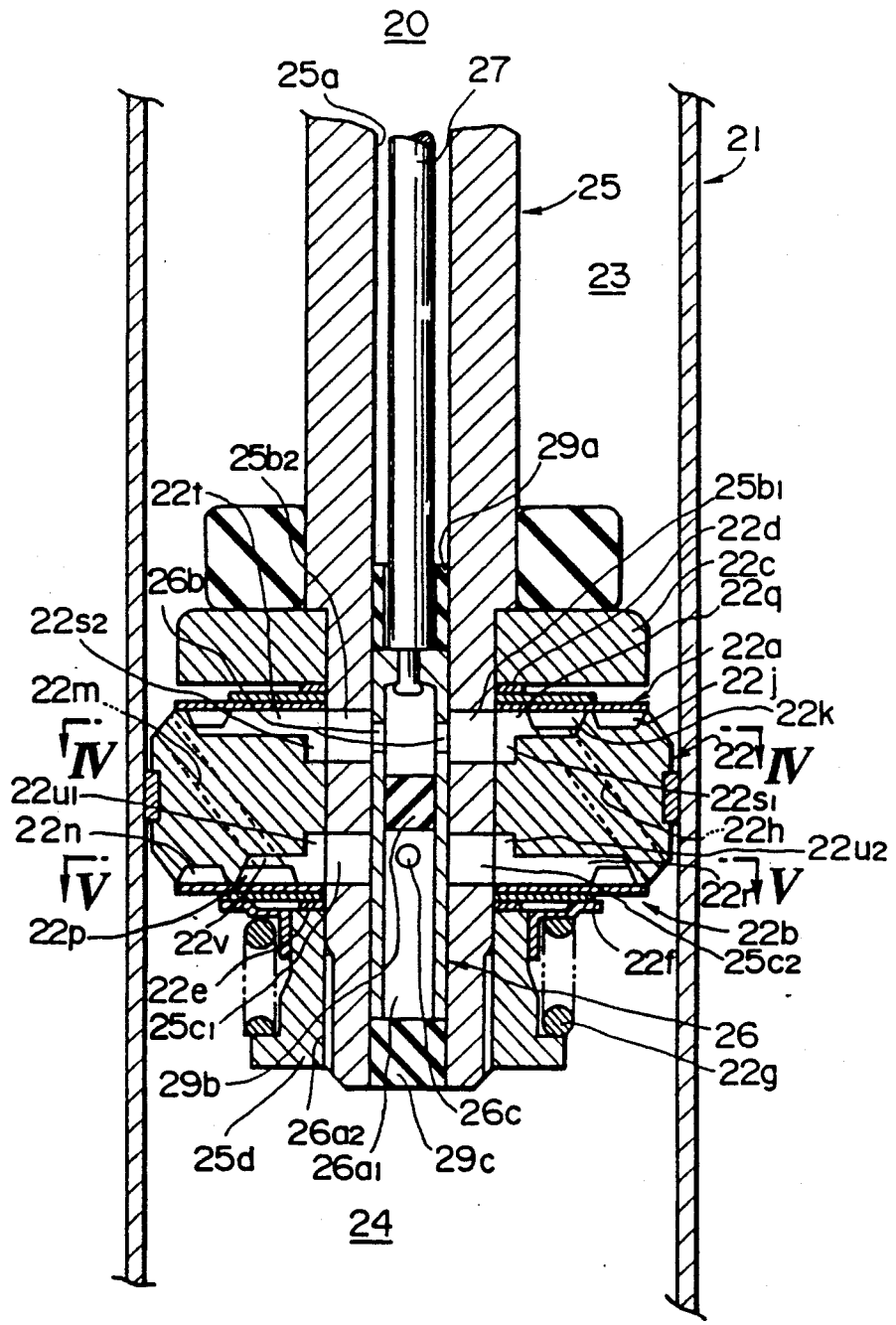
FIG. 2 is an enlarged section of the major part of a variable damping force shock absorber to be employed in the preferred embodiment of the suspension control system of FIG. 1.

Now, referring to FIG. 2, the preferred construction of the variable damping force shock absorber 20 comprises a hollow cylinder 21 filled with a working fluid. A piston body 22 is thrustingly or slidingly disposed within the interior space of the cylinder 21 for dividing the inside space of the cylinder into upper and lower fluid chambers 23 and 24. The piston is secured on the lower end of the piston rod 25 which extends upwardly from the cylinder 21 and connected to the vehicular body as shown in FIG. 1.

The upper and lower fluid chambers 23 and 24 are communicated with fluid paths 22h and 22m defined through the piston body 22. The fluid path 22h is designed to permit fluid flow directed from the lower fluid chamber 24 to the upper fluid chamber 23, which fluid flow is caused due to piston thrusting motion relative to the cylinder 21 in a bounding direction. Therefore, the fluid path 22h will be hereafter referred to as "bounding fluid path". On the other hand, the fluid path 22m is designed to permit fluid flow from the upper fluid chamber 23 to the lower fluid chamber 24, which fluid flow is caused due to piston rebounding motion relative to the cylinder 21. Therefore, the fluid path 22m will be hereafter referred to as a "rebounding fluid path". As can be seen in FIGS. 2 and 3, the piston body 22 also defines essentially annular inner and outer grooves 22k and 22j; 22p and 22n on the upper and lower surfaces thereof. Also, the piston body defines a pair of axially extending grooves 22s1 and 22s2 on the upper surface thereof. The axially extending groove 22s1 is communicated with the upper inner groove 22k via a radial groove 22q. On the other hand, the axially extending groove 21s2 is communicated with the upper outer groove 22j via a radial groove 22t. Similarly, a pair of axially extending grooves 22u1 and 22u2 are communicated with the lower inner and outer grooves 22p and 22n via radial grooves 22v and 22r. The axially extending grooves 22s1 and 22s2 are in communication with radial ports 25b1 and 25b2 radially extending through the piston rod 25. Similarly, the axially extending grooves 22u1 and 22u2 are in communication with radial ports 25c1 and 25c2 defined through the piston rod 25.

The piston rod 25 is of generally cylindrical construction with an axially extending through opening 25a. An actuator rod 27 which is connected to the actuator 28 for rotation by the actuating force applied by the actuator. A rotary valve member 26 is secured on the lower end thereof for rotation therewith. Seal blocks 29a, 29b and 29c are defining upper and lower communication chambers 26a1 and 26a2. The upper communication chamber 26a1 is selectively established and blocked for communication with the radial ports 25b1 and 25b2 via radial orifices 26b defined through the rotary valve 26. Similarly, the lower communication chamber 26a2 is selectively established and blocked fluid communication with radial ports 25c1 and 25c2 via radial orifices 26c. In FIG. 2, the radial orifices 26b are in positions establishing the fluid communication between the upper communication chamber 26a1 and the radial ports 25b1 and 25b2; and the radial orifices 26c are in positions blocking the fluid communication therethrough. Namely, in the shown embodiment, the radial orifices 26b and 26c are so oriented to have 90° of angular shift so that the axes thereof extending in directions perpendicular to each other, as clearly show sections in FIGS. 4 and 5 which respectively shown IV—IV and V—V of FIG. 2. With this construction, when one of the radial orifices 26b and 26c is in alignment with the associated one of radial ports 25b1 and 25b2 or 25c1 and 25c2 for fluid communication, the other radial orifices are placed out of fluid communication. As can be appreciated, when fluid communication through the radial orifices is established, a greater amount of fluid can flow from one of the upper and lower fluid chambers 23, 24 to the other for providing softer suspension characteristics. On the other hand, when fluid communication through the radial orifices is blocked, the fluid flow rate from one of the upper and lower fluid chambers to the other chamber becomes smaller to provide harder suspension characteristics. Therefore, in the shown construction, according to the angular position of the rotary valve 26, suspension characteristics for piston bounding stroke and rebounding stroke can be adjusted in an alternating fashion.

The bounding fluid path 22h has an upper end opening to the upper inner groove 22k and a lower end directly exposed to the lower fluid chamber 24. Similarly, the rebounding fluid path 22m has an upper end directly exposed to the upper fluid chamber 23 and a lower end opening to the lower inner groove 22p.

Upper and lower disc valves 22a and 22b are provided over the grooves formed on upper and lower surfaces of the piston body 22 for resiliently closing blocking fluid communication between inner and outer annular grooves 22k and 22j; 22p and 22n; and between the outer annular grooves 22j and 22n and the corresponding one of the upper and lower fluid chambers 23 and 24. The piston body 22 and the upper and lower disc valves 22a and 22b form a piston assembly together with a retainer 22c, washers 22d, 22e, a spring seat member 22f and a spring 22g. The components of the piston assembly are firmly fixed on the lower end of the piston rod by means of a fastening nut 25d threadingly engaged with the threaded end of the piston rod. The fastening nut 25d also serves as a lower spring seat on which the lower end of the spring 22g seats.

In the piston bounding stroke relative to the cylinder 21 while compressing the lower fluid chamber 24, the increased fluid pressure in the lower fluid chamber 24 is introduced into the upper inner groove 22k via the bounding fluid path 22h. Part of the pressurized fluid in the upper inner groove 22k flows into the axially extending groove 22s1 and subsequently flows into the radial port 25b1. Assuming that the rotary valve 26 is in an angular position as illustrated in FIGS. 2 and 4, fluid communication between the upper communication chamber 26a1 and the radial port 25b1 is established via the radial orifice 26b. Therefore, the pressurized fluid flows into the upper outer groove 22j via the radial orifice 26b, the radial port 25b2 and the radial groove 22t. During the fluid flow set forth above, the radial orifices 26b serve for generating damping force by restricting fluid flow rate therethrough. The magnitude of damping force thus generated by the radial orifice is generally proportional to square of the piston stroke speed.

On the other hand, the other part of the pressurized fluid may flow from the upper inner groove 22k to the upper outer groove 22j via a gap formed therebetween by deformation of the upper disc valve 22a when the fluid pressure in the inner groove overcomes the spring force of the upper disc valve. The part of the fluid flowing into the upper outer groove 22j combines with the pressurized fluid through the other route to flow into the upper fluid chamber 23 via a gap formed by deformation of the upper disc valve. The gap formed by deformation of the upper disc valve 22a may serve to provide flow restriction for generating a damping force. The damping force thus generated varies in a rate substantially proportional to ⅔ power of the piston stroke speed. This damping characteristics at the gap cooperate with the damping characteristics provided by the radial orifice to provide substantially linear damping force variation characteristics.

In response to the piston rebounding stroke relative to the cylinder 21, fluid flow is generated in substantially the same manner as that discussed hereabove. However, when the rotary valve 26 is maintained at the position as illustrated in FIG. 2, the radial orifices 26c are maintained out of communication within the radial ports 22u1 and 22u2. Therefore, the fluid is not permitted to flow through the route across the radial orifice and thus only permitted to flow through the gap to be formed by deformation of the lower disc valve. In such case, since the magnitude of flow restriction becomes much greater than that in the piston bounding stroke, harder suspension characteristics can be obtained.

With the construction set forth above, suspension control is performed by the control unit 13 in a semi-active manner. In general, semi-active suspension control is performed on the basis of skyhook theory. In the present invention, the relative speed between the vehicular body and the vehicular wheel and the vertical acceleration are taken as parameters for performing suspension control. In order to introduce factors of direction of relative speed, a reference load value is set at a neutral position of the vehicular body relative to the vehicular wheel. With taking the reference load, the direction of the relative speed is discriminated in such a manner that, when the load indicative signal value is greater than the reference value, piston rebounding stroke can be detected, and when the load indicative signal value is smaller than the reference value, piston bounding stroke can be detected. On the other hand, polarity of the vertical acceleration indicative signal represents direction of the vertical acceleration exerted on the vehicular body. In the shown embodiment, the vertical acceleration indicative signal value becomes positive in response to upward vertical acceleration and negative in response to downward vertical acceleration.

Figure 6:
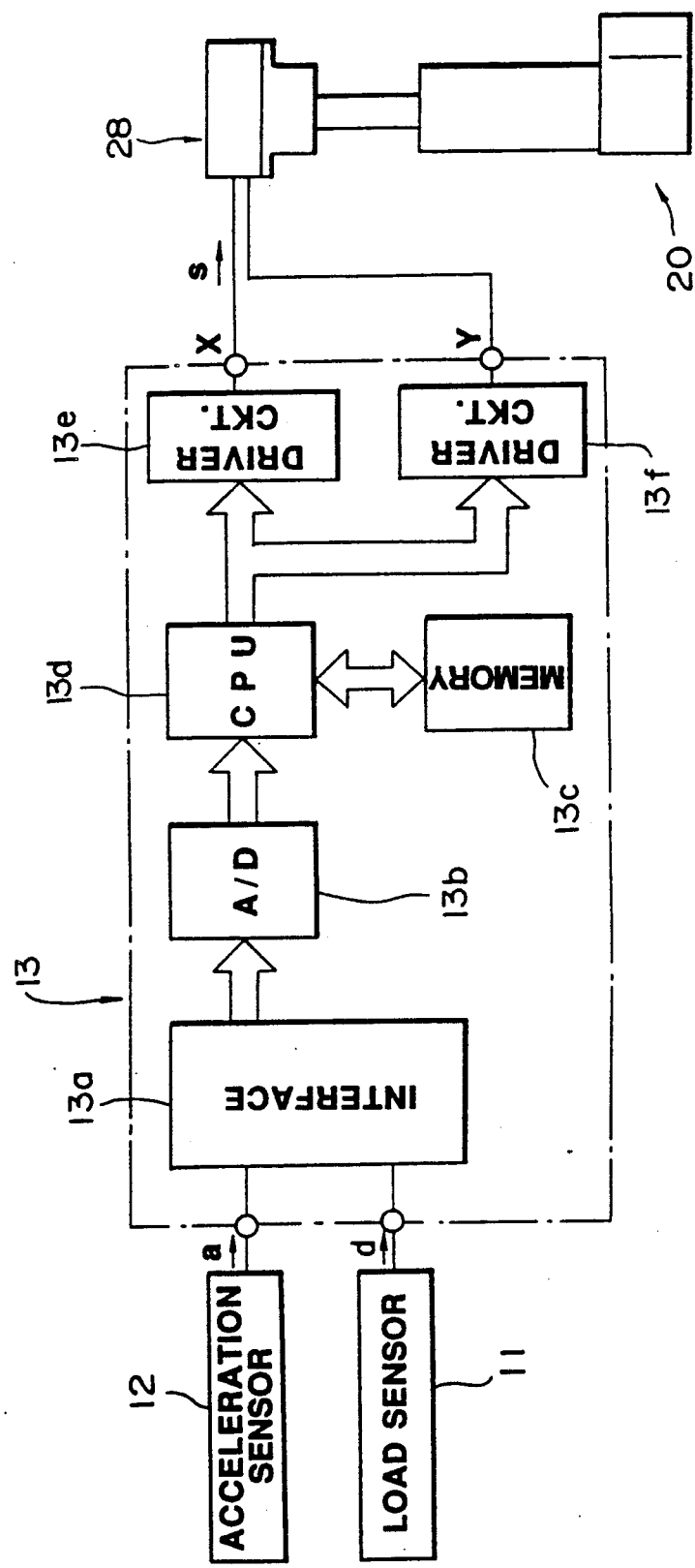
FIG. 6 is a block diagram of the preferred embodiment of the preferred embodiment of the suspension control system according to the present invention.
Figure 7:
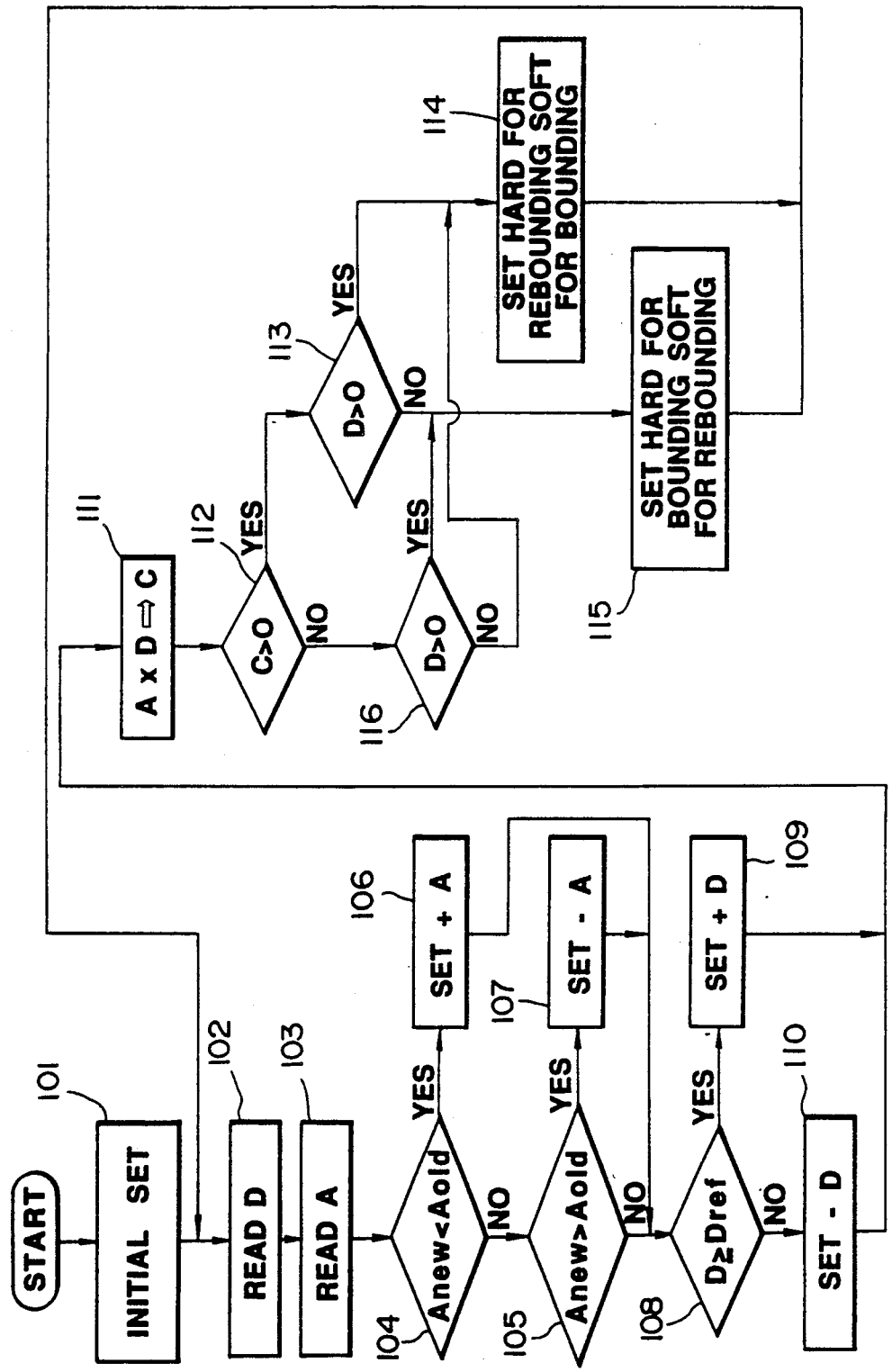
FIG. 7 is a flowchart of a suspension control program to be executed by the control unit in the preferred embodiment of the suspension control system of the invention.

As shown in FIG. 6, the control unit 13 comprises a microprocessor including an input interface 13a, an analog-to-digital (A/D) converter 13b, a memory unit 13c which may include RAM and ROM, CPU 13d and driver circuits 13e and 13f. The vertical load sensor 11 and the vertical acceleration sensor 12 are connected to the input interface 13a via input ports. Both of the vertical load indicative signal d and the vertical acceleration indicative signal a are supplied in forms of analog signals and converted into digital data signals by the A/D converters 13b and supplied to the CPU 13d. The CPU 13d processes the input data signals for deriving appropriate damping characteristics of respective suspension systems and thus produces suspension control signals s for driving the actuators 28. The process of derivation of the control signal s will be discussed herebelow with reference to FIG. 7.

It should be appreciated that the shown route is performed cyclically or periodically at every given timing. At a step 101, initialization is taken place for setting polarities of both vertical load indicative data D derived on the basis of the vertical load indicative signal d and the vertical acceleration indicative data A derived on the basis of the vertical acceleration indicative signal a, at HIGH level to represent positive values thereof. Then, the vertical load indicative data D is updated by the corresponding input data from the A/D converter 13b at a step 102. The updated vertical load indicative data is temporarily stored in a register. At a step 103, the vertical acceleration indicative data A is updated by the corresponding data from the A/D converter 13b. With the updated vertical acceleration indicative data A, content in a register is updated to store current vertical acceleration data Anew and immediately preceding vertical acceleration data Aold.

Then, the current acceleration data Anew is compared with the preceding acceleration data Aold to see whether the current acceleration data value Anew is smaller than the preceding acceleration data Aold at a step 104. In this step 104, a check is performed whether the vertical acceleration is decreasing for detecting direction of motion speed of the vehicular body. Namely, when the vertical acceleration is decreasing, upward motion of the vehicular body is detected. If this is the case, the polarity of the vertical acceleration data A becomes positive at a step 106. If not, a check is performed whether the current vertical acceleration indicative data value Anew is greater than the preceding vertical acceleration indicative data Aold at a step 105. When the current vertical acceleration data Anew is greater than the preceding vertical acceleration indicative data Aold and thus increasing of vertical acceleration to indicate downward motion of the vehicular body, the polarity of the vertical acceleration indicative data value is set negative at a step 107.

Thereafter, the vertical load indicative data D is compared with the reference value Dref representative of the neutral relative position between the vehicular body and the vehicular wheel, at a step 108. If the vertical load indicative data value D is equal to or greater than the reference value Dref as checked at the step 108, the polarity of the load indicative signal D is set positive at a step 109. Otherwise, the polarity of the load indicative signal D is set negative at a step 110. Then, the vertical acceleration indicative data and the load indicative data are multiplied by each other to check if those have the same polarities or not, at a step 111. The product C derived at the step 111 is then checked if it is greater than 0, which represents the same polarity of the vertical acceleration data and the relative speed as represented by the load indicative data, at a step 112. If the answer at the step 112 is positive, then, the polarity of the load indicative data D is checked at a step 113. When the polarity of the load indicative data is positive, the process goes to a step 114 to set the control signal for harder suspension characteristics against a piston rebounding stroke and softer suspension characteristics against a bounding stroke. That is, in response to this control signal, the actuator drives the rotary valve 26 to off-align the radial orifices 26b from the radial ports 25b1 and 25b2 and to align the radial orifices 26c to the radial ports 25c1 and 25c2. On the other hand, when the polarity of the load indicative data D is negative, the process goes to a step 115 to set the control signal for harder suspension characteristics in response to bounding stroke and softer suspension characteristics in response to rebounding stroke. The control signal is fed to the actuator 28 for driving the rotary valve 26 for rotation 90° from the position set at the step 114 as set forth so that off-align the radial orifices 26c from the radial ports 25c1 and 25c2 and align the radial orifices 26b to the radial ports 25b1 and 25b2.

On the other hand, when the product derived at the step 111 is not greater than zero as checked at the step 112, then, the load indicative data D is checked at a step 116. If the load indicative data is greater than zero, the process goes to the step 115 and otherwise to the step 114.

Practical operation to be performed by the shown embodiment of the suspension control system according to the present invention, discussed hereabove, will be explained in more detail with reference to FIGS. 8 and 9 for facilitating more clear understanding of the invention.

Figure 8:
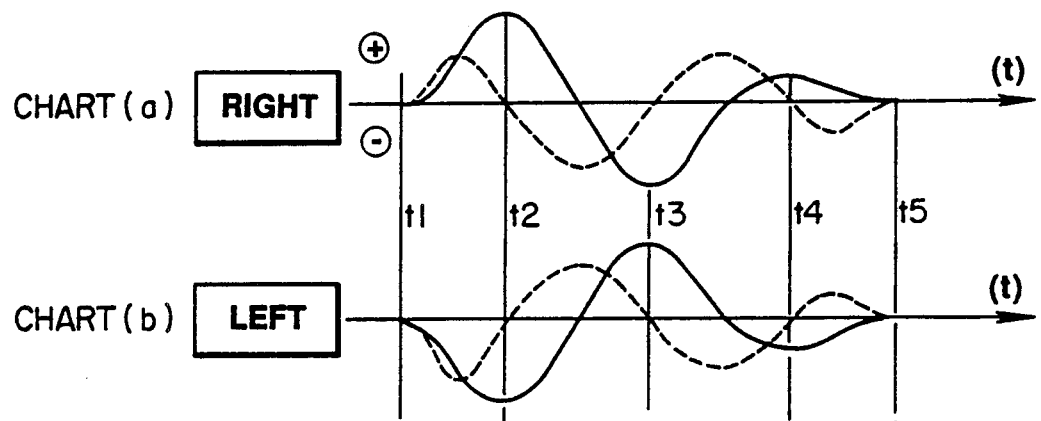
FIG. 8 is a chart showing operation of the preferred embodiment of the suspension control system according to the present invention at a right hand turn.

FIG. 8 shows activities caused upon left-hand rolling for right-hand turning of the vehicle. In the practical driving, the vehicular body VB rolls to lower the left side and lift-up the right side at the occurrence of left-hand rolling. The magnitude of rolling is gradually decreased to resume a neutral attitude of the vehicular body. In FIG. 8, the solid lines in charts (a) and (b) show vehicular body displacement during left-hand rolling. On the other hand, the broken lines in charts (a) and (b) show vehicular body motion speed. During this period, the polarities of the vertical acceleration indicative data A and the load indicative data D vary as shown in tables (c) and (d). Corresponding to the phase (polarity) relationship of the vertical acceleration indicative data A and the load indicative data D, and the phase of the load indicative data D, the suspension characteristics at respective of the left and right suspension systems are adjusted as shown in table (e).

As can be seen in the chart (a) in FIG. 8, since the vehicular body speed at the right side suspension system is upward during the period between timings t1 and t2, the polarity of the vertical acceleration indicative data given at the step through the steps 105 to 107 becomes positive. At the same time, since the direction of relative speed as represented by the load indicative data D is also upward, the polarity of the load indicative signal becomes positive. Therefore, suspension control signal for setting the suspension characteristics of the right side suspension systems harder for rebounding motion and softer for bounding motion. On the other hand, as can be seen in the chart (b) in FIG. 8, since the vehicular body speed at the left side suspension system is downward during the period between timings t1 and t2, the polarity of the vertical acceleration indicative data A is set at negative at the step 107. At the same time, the relative speed between the vehicular body and the vehicular wheel is in a downward direction, therefore the polarity of the load indicative signal is also set negative. Therefore, harder suspension characteristics for bounding motion and softer suspension characteristics for rebounding motion are set at the step 115.

In the similar manner, suspension characteristics can be set during respective periods between t2 to t3, t3 to t4 . . . . The suspension characteristics assumed for respective of the right and left suspension systems can be seen from the table (e) of FIG. 8.

It should be noted that during vehicular pitching, i.e. nose diving or squatting, a similar manner of suspension control can be performed. In case of pitching suppressive control, a different mode of control can be performed between front and rear suspension systems instead of right and left suspension systems.

FIG. 9 shows activity of the preferred embodiment of the suspension control system during bouncing mode motion of the vehicle. In FIG. 9, the chart (a) show vertical displacement XA of the vehicular body and displacement speed Δ XA in relation to road surface undulation as illustrated in the chart (b). During this motion, relative displacement XR and relative speed Δ XR vary in a manner illustrated in the charts (c).

As can be seen in tables (d), (e) and (f) in FIG. 9, during a period (1), the suspension characteristics is maintained as initially set. Namely, at this position, the suspension characteristics is set for harder suspension characteristics in rebounding stroke and softer suspension characteristics in bounding stroke. Since no bounding and rebounding motion causing noticeable vibration of the vehicular body is caused, the suspension characteristics is maintained as initially set. Assuming bounding mode vibration is caused on the vehicular body at the beginning of a period (2), the acceleration indicative data A is set at positive polarity and the load indicative data D is set at negative polarity. As a result, hard suspension characteristics for rebounding motion and softer suspension characteristics for bounding is assumed through the step 115. At the beginning of a period (3), the relative speed XR turns into positive. Therefore, both polarity of the vertical acceleration indicative data A and the load indicative data D become positive. Therefore, suspension characteristics is maintained unchanged to assume harder suspension characteristics for rebounding stroke and softer suspension characteristics for bounding stroke. On the other hand, at the beginning of the period (4) or at the end of the period (3), the polarity of the vertical acceleration indicative signal A becomes negative. Therefore, the suspension characteristics is switched to assume harder suspension characteristics for bounding stroke and softer suspension characteristics for rebounding stroke. By repeating the process set forth above, the suspension characteristics can be controlled adapted to the vehicular body vibration mode.

As can be appreciated herefrom, though the shown embodiment of the suspension control system has a capability of vibration mode dependent suspension control so as not to control suspension characteristics in semi-active manner depending upon magnitude of vibration with successful reduction of occurrence of lesser number of the actuator operation.

While the present invention has been discussed hereabove in terms of the preferred embodiment of the invention, the invention should not be limited to the disclosed construction but can be taken in any appropriate suspension control systems. Therefore, the invention should be understood to include all possible embodiments and modifications thereof which can be embodied without departing from the principal of the pending claims.

What is claimed is:

1. A suspension control system for an automotive vehicle comprising:

a suspension system disposed between a vehicular body and a vehicular wheel and having a damping force generating means for generating a damping force against relative displacement between the vehicular body and the vehicular wheel from a neutral position, said damping force generating means being variable in its damping characteristics at least between a hard mode to produce a greater damping force and a soft mode to produce a smaller damping force;

an actuator associated with said damping force generating means, for controlling an operational mode at least between said hard mode and said soft mode depending upon a control signal supplied thereto;

first means for monitoring relative speed between said vehicular body and said vehicular wheel to produce a relative speed representative signal variable in polarity depending upon direction of the relative speed;

second means for monitoring vertical acceleration exerted on said vehicular body to produce a vertical acceleration representative signal which is variable in polarity depending upon the direction of the vertical acceleration exerted; and third means receiving said relative speed representative signal and said vertical acceleration representative signal for deriving said control signal on the basis of phase relationship of said relative speed representative signal and said vertical acceleration representative signal, and of phase of said relative speed representative signal.

2. A suspension control system as set forth in claim 1, wherein said damping force generating means is variable in damping characteristics for a bounding stroke and for a rebounding stroke in an alternating fashion.

3. A suspension control system as set forth in claim 1, wherein said damping force generating means is variable in damping characteristics for a bounding stroke and for a rebounding stroke independently of each other.

4. A suspension control system as set forth in claim 2, wherein said third means generates said control signal for assuming a hard mode for a rebounding stroke and a soft mode for a bounding stroke when the polarities of said relative speed representative signal and said vertical acceleration representative signal are coincident with each other and the polarity of said relative speed representative signal represents the relative speed in a rebounding direction, and for assuming a hard mode for a bounding stroke and a soft mode for a rebounding stroke when polarities of said relative speed representative signal and said vertical acceleration representative signal are coincident and the polarity of said relative speed representative signal represents the relative speed in a bounding direction.

5. A suspension control system as set forth in claim 4, wherein said third means generates said control signal for assuming a hard mode for a bounding stroke and a soft mode for a rebounding stroke when the polarities of said relative speed representative signal and said vertical acceleration representative signal are different from each other and the polarity of said relative speed representative signal represents a rebounding stroke, and for assuming a hard mode for a rebounding stroke and a soft mode for a bounding stroke when the polarities of said relative speed representative signal and said vertical acceleration representative signal are different from each other and the polarity of said relative speed representative signal represents a bounding stroke.

6. A suspension control system as set forth in claim 2, wherein said damping force generating means comprises a variable damping force shock absorber defining first and second fluid chambers communicated with each other across primary fluid path means and an auxiliary fluid path means defined through a piston disposed between said first and second fluid chambers and a variable orifice means providing varying flow restriction magnitude in said auxiliary fluid path means.

7. A suspension control system as set forth in claim 6, wherein said auxiliary fluid path means comprises a first auxiliary fluid path active for permitting fluid flow therethrough during a piston rebounding stroke and a second auxiliary fluid path active for permitting fluid flow therethrough during a piston bounding stroke, and said variable orifice means comprises a first orifice provided in said first auxiliary fluid path and a second orifice provided in said second auxiliary fluid path, said first and second orifices being variable in flow restriction magnitude at least between a hard mode and a soft mode.

8. A suspension control system as set forth in claim 7, wherein said variable orifice means comprises a single rotary valve defining said first and second orifices and associated with an actuator means to be rotatingly driven for varying an operational mode between a first position corresponding to a hard mode and a second position corresponding to a soft mode.

9. A suspension control system as set forth in claim 8, wherein said first and second orifices are formed axially and angularly offset with respect to each other, a magnitude of angular offset of said first and second orifices so determined as to place said second orifice at said second position when said first orifice is set at said first position, and at said first position when said first orifice is set at said second position.

10. A variable damping force shock absorber comprising:
a hollow cylinder;
a piston disposed within said hollow cylinder and defining first and second fluid chambers communicated with each other across primary fluid path means and an auxiliary fluid path means defined therethrough, said first and second fluid chambers and a variable orifice means providing varying flow restriction magnitude in said auxiliary fluid path means, said auxiliary fluid path means including a first auxiliary fluid path active for permitting fluid flow therethrough during a piston rebounding stroke and a second auxiliary fluid path active for permitting fluid flow therethrough a during piston bounding stroke, and said variable orifice means including a first orifice provided in said first auxiliary fluid path and a second orifice provided in said second auxiliary fluid path, said first and second orifices being variable in flow restriction magnitude at least between a hard mode and a soft mode, wherein said variable orifice means comprises a single rotary valve defining said first and second orifices and associated with an actuator means to be rotatingly driven for varying an operational mode between a first position corresponding to said hard mode and a second position corresponding to said soft mode.

11. A variable damping force shock absorber as set forth in claim 10, wherein said first and second orifices are formed axially and angularly offset with respect to each other, a magnitude of angular offset of said first and second orifices so determined as to place said second orifice at said second position when said first orifice is set at said first position, and at said first position when said first orifice is set at said second position.

12. A variable damping force shock absorber as set forth in claim 11, wherein said first and second orifices block fluid communication at said first position and permit fluid communication at said second position.

* * * * *